United States Patent Office 3,484,420
Patented Dec. 16, 1969

3,484,420
VINYL ACETATE-CROTONIC ACID-HIGHER
ALKYLCROTONATE TERPOLYMERS
Yuzo Chihara, 44 Otsutomocho Kanazawaku,
Yokohama-shi, Kanagawa-ken, Japan
No Drawing. Filed Oct. 17, 1966, Ser. No. 586,930
Int. Cl. C08f 15/40, 15/20, 45/24
U.S. Cl. 260—80.8                    12 Claims

ABSTRACT OF THE DISCLOSURE

An alkali-soluble resin consisting essentially of a random copolymer of 75–95% vinyl acetate, 3–15% crotonic acid and 3–20% alkyl crotonate having at least 4 carbon atoms in the alkyl radical.

---

As regards the resins soluble in an aqueous alkaline solution, there have been heretofore known copolymers of vinyl acetate and various unsaturated carboxylic acid. For example, a copolymer of vinyl acetate and monoalkylester of maleic acid, acrylic acid, methacrylic acid, crotonic acid or the like is soluble in an aqueous solution of alkali such as aqueous solution of sodium hydroxide, potassium hydroxide, ammonia or the like. These solutions are viscous even at a relatively low concentration and are now finding use in various fields of application such as starching agent, sizing agent, adhesive and the like.

However, when such a copolymer is used in the form of aqueous alkaline solution, particularly when such a copolymer is that of vinyl acetate and crotonic acid and it is dissolved in an alkaline aqueous solution, it takes the gel state at a relatively low concentration. For example when it is dissolved in an aqueous solution containing 2 to 3 equivalent amount of ammonia relative to the carboxylic radical included in the copolymer, it forms a solution of 5 to 20 cps. (at 30° C.) up to a resin concentration of ten and odd percent but turns to such gel state at concentrations higher than about 20 percent by weight that the use of it is extremely inconvenient. Moreover when it is used as an adhesive for paper coating, since the high solid concentration of coating color brings about sharp increase of viscosity it must be used at a high water ratio. Such a high water ratio results in a long drying time and a reduced coating velocity.

Further since such a copolymer consists mainly of vinyl acetate, and contains a small amount of carboxylic radical, the film derived therefrom has disadvantages in low-temperature brittleness and inferior softness inherited from the properties of polyvinyl acetate. When it is used as an adhesive for paper coating, the glossiness and smoothness of the coated paper prepared by way of the common calendering are by no means satisfactory.

Accordingly it has been desired to produce the above-mentioned copolymer having a relatively low softening point and sufficient softness.

It is an object of the present invention to provide a method for producing a copolymer consisting mainly of the part derived from vinyl acetate and having softness and a low softening point. It is another object of the present invention to provide a method for producing a copolymer which can be dissolved in an alkaline aqueous solution to give a clear solution having a sufficient fluidity even at the concentration of about 20 to 25 percent by weight. It is a further object of the present invention to provide a copolymer possessing the above-mentioned properties.

These objects and other advantages can be attained by the method of the present invention.

According to the method of the present invention, higher alkylester of crotonic acid, namely that having the alkyl radical of at least 4 carbon atoms is added to a mixture of vinyl acetate and crotonic acid in an amount preferably more than several percent by weight. The resulting mixture is then subjected to the polymerization such as suspension polymerization or emulsion polymerization in the presence of a radical polymerization catalyst to yield a copolymer which is soluble in an alkaline solution to give a low viscosity solution and a soft film.

If instead of a higher alkylester of crotonic acid, a lower alkylester of crotonic acid is used in the above-mentioned method, the reduction of viscosity is not sufficient. When the copolymer of the present invention containing a higher alkylesters of crotonic acid is compared with the polymer containing the same two components but does not contain the part derived from a higher alkylester of crotonic acid by dissolving in an aqueous solution of ammonia, to give the solutions having 20 percent concentration of resin, it is observed that the former gives a large extent of reduction in viscosity relative to the latter, hence it is much more convenient for the use and the softening point of the film prepared from the former is also reduced.

The reduction of the softening point varies depending upon the kind of the alkylester but it is about 5° to 10° C. when the content of alkylester is in the range of about 10 to 20 percent.

Beside the above-mentioned higher alkylester of crotonic acid as the third component of vinyl acetate-crotonic acid copolymer, higher alkylester of acrylic acid, higher alkylester of methacrylic acid, higher alkyl vinylether, higher alkylester of itaconic acid and the like can be thought of. However they have drawbacks in the points that when they are used in a large amount, the part which does not dissolve in an alkaline aqueous solution is formed which causes white turbidity and the effectiveness of viscosity reduction by such compounds is relatively small.

In contrast to the above-mentioned third component, when a higher alkylester of crotonic acid is used as in the present invention, it is possible to obtain a copolymer which is always readily soluble in an alkaline aqueous solution to give a low viscosity, clear solution so long as the content of crotonic acid is more than 3 percent by weight, irrespective of the polymerization method used.

Regarding the proportions of monomers used in the production of the present copolymers, it is preparable that vinyl acetate is in the range of 75 to 94 percent by weight, crotonic acid is in the range of 3 to 15 percent by weight and a higher alkyl ester of crotonic acid is in the range of 3 to 20 percent by weight.

The advantage of the alkali-soluble resin prepared in accordance with the present invention can be more fully understood by the following numerical comparison carried out between the resin of the present invention and the vinyl acetate-crotonic acid copolymers which do not contain the higher alkylester of crotonic acid.

| Kind of alkali-soluble resin | Polymerization method | Ratio of components, percent | Viscosity of ammonia-alkaline aqueous solution containing 20% resin, cps. |
|---|---|---|---|
| (a) Vinyl acetate (VAC)—crotonic acid (CA) copolymer | Emulsion polymerization product | VAC 94; CA 6 | 20,000–25,000 |
| (b) Vinyl acetate (VAC)—crotonic acid (CA) copolymer | do | VAC 97; CA 3 | 20,000–25,000 |
| (c) Vinyl acetate (VAC)—crotonic acid (CA) copolymer | Suspension polymerization product | VAC 95; CA 5 | 20,000–25,000 |
| (d) Resin of the present invention | do | VAC 90; CA 5; butyl crotonate 5 | 500–800 |
| (e) Resin of the present invention | do | VAC 85; CA 5; octyl crotonate 10 | 100–300 |
| (f) Resin of the present invention | do | VAC 80; CA 5; octyl crotonate 15 | 50–100 |
| (g) Resin of the present invention | do | VAC 90; CA 5; butyl crotonate 5 | 600–900 |
| (h) Resin of the present invention | do | VAC 85; CA 5; octyl crotonate 10 | 50–150 |
| (i) Resin of the present invention | do | VAC 80; CA 5; lauryl crotonate 15 | 50–200 |
| (j) Resin of the present invention | do | VAC 80; CA 5; cetyl crotonate 15 | 300–500 |
| (k) Resin of the present invention | do | VAC 75; CA 5; stearyl crotonate 20 | 200–400 |

The measurements of viscosities of solutions in the abovementioned comparison are carried out by the following procedure; Resins are dispersed in water in such a way as to give a little higher than 20 percent dispersions. The dispersions are heated to 40° C. with stirring. When 28 percent aqueous ammonia is added to each of the dispersions in a ratio of one part per 10 parts by weight of the resin, the pispersion becomes viscous solution. After adjusting the water content, so as to give exactly 20 weight percent of resin in solution the viscisities are measured at a temperature of 30° C. and stirring of 30 r.p.m. by BL or BH type viscosimeter.

The viscosity of the solution of the present copolymer dissolved in the aqueous ammonia in the above-specified proportion is, in general, so low as less than 2000 cps, preferably, less than 1000 cps. when measured by the above-specified condition.

From the above-mentioned ammonia aqueous solutions having different viscosities, coating colors for paper coating having relatively high solid concentrations are prepared.

Coating colors have usually been produced in a kneader by adding binders such as SBR latex and casein to a pigment such as clay. The alkaline aqueous solution in which the resin of the present invention is dissolved, can be wholly or partially substituted for the customarily used binders to improve the properties of coating colors exceedingly.

The viscosities of the coating colors prepared by the use of the aqueous ammonia alkaline solution containing the resin of the present invention as binders are compared with those prepared by the use of the aqueous ammonia alkaline solution containing other kinds of resin at two different solid content of the coating colors. Namely (a) an ammonia alkaline aqueous solution containing 20 percent by weight of emulsion polymerization product (VAC 94%, CA 6%) and having a viscosity of 20,000 to 25,000 cps. of 30° C. and with stirring of 30 r.p.m., (b) an ammonia alkaline aqueous solution containing 20 percent by weight of emulsion polymerization product (VAC 85%, CA 5% and octyl crotonate 10%) and having a viscosity of 150 cps. at 30° C. and with stirring of 30 r.p.m. [cf.(h) of the abovementioned comparison] and (c) an ammonia alkaline aqueous solution containing 20 percent by weight of emulsion polymerization product (VAC 75%, CA 5%, and stearyl crotonate 20%) and having a viscosity of 300 cps. at 30° C. and with stirring of 30 r.p.m. [cf. (k) of the above-mentioned comparison] are prepared. Ninety parts by weight of either of the solutions (a) (b) or (c), 5 parts by weight of 10 percent by weight of aqueous solution of hexametaphosphate, and 21 parts by weight of additional water are mixed with 100 parts by weight of clay (Takahata Kaolin) to give a coating color having a 55% by weight solid content. Further 90 parts by weight of either of the solutions (a) (b) or (c), 5 parts by weight of 10 percent by weight of aqueous solution of hexametaphosphate and 3 parts by weight of additional water are mixed with 100 parts by weight of the same clay to give a coating color having a solid content of 60%.

Measured results of viscosities are shown in the following table.

| | Solid content, percent | Kinds of resin incorporated | Viscosities of coating colors at 30° C. with stirring of 30 r.p.m., cps. |
|---|---|---|---|
| Table | 55 | a | 15,000–20,000 |
| | | b | 1,000–1,500 |
| | | c | 2,000–3,000 |
| | 60 | a | 40,000–60,000 |
| | | b | 3,000–4,000 |
| | | c | 4,000–5,000 |

Coating colors thus prepared are coated onto bases of art paper or coating bases and after drying, processed by way of a super-calender at a temperature of 60° C. to give surface treatment. The qualities of the surface of the coated paper (coated amount is 10 dry gr. per m.²) are estimated. Glossiness, whiteness, and smoothness are found to be in the orders of c>b>a, c>b>a and c>b>a, respectively. Obiously, the effectiveness of the resin of the present invention is remarkable. In order that those skilled in the art may more fully understand, the nature of the present invention and the composition and the condition of polymerization, the following examples are given.

Example 1

102 parts by weight of aqueous solution containing 2 parts by weight of a salt of carboxymethyl cellulose (CMC) were prepared in an emulsion polymerization vessel equipped with a dropping apparatus, a stirrer and a reflux condenser. To this aqueous solution well mixed, 2 parts by weight of a non-ionic surfactant (noigen ET 190), as an emulsifier, one part by weight of ammonium persulfate, as a polymerization catalyst, where added and the mixture was heated to 60° C. under the atmosphere of nitrogen. Then a mixture of 90 parts by weight of vinyl acetate, 5 parts by weight of butyl crotonate and 5 parts by weight of crotonic acid was prepared and dropped gradually into the polymerizatioin vessel with stirring at a temperature of 65–70° C. over the period of about 3 to 4 hours to subject it to the emulsion polymerization. After completion of dropping, stirring was continued further 2 hours and then the solution was gradually heated to a temperature of 70–75° C. to complete the reaction. One hour later, a small amount of unreacted product was recovered together with water by elevating the temperature to 80° C. and blowing nitrogen little by little and thereafter the emulsion polymerized solution was obtained after cooling with a yield of solution of 203 parts by weight, a solid content of 51.2 percent by weight, a concentration of resin of 49.5 percent and an efficiency of more than 99 percent.

By the similar procedure, an emulsion polymerization product was prepared from 95 parts by weight of vinyl acetate and 5 parts by weight of crotonic acid and compared with the above-mentioned ternary copolymer in the points of viscosities of ammonia alkaline aqueous solution and of coating color incorporated with Kaolin and other additives. Namely by the procedure above-described, an ammonia alkaline aqueous solution containing 20% resin was prepared, the viscosity of this solution was measured and by using this solution and by the same method as above-described, a coating color having a solid content of 60% was produced and the viscosity of resulting coating color was measured. The results are shown in the following table.

|  | Product of Example 1, cps. | Product of control, cps. |
|---|---|---|
| Viscosities of ammonia alkaline aqueous solution having a resin concentration of 20% at 30° C. and 30 r.p.m. | 700 | 23,000 |
| Viscosities of 60% coating color at 30° C. and 30 r.p.m. | 5,500 | ca. 60,000 |

Coated papers were dried and processed with a super calender at a temperature of 60° C. It was observed that the qualities of the product of Example 1 such as glossiness, whiteness and smoothness were far superior to those of the product of control.

Example 2

The emulsion polymerization was carried out in the same polymerization vessel as in Example 1 by using the following formulation and polymerization condition.

Formulation—
  A mixture of monomers:
    Vinyl acetate _____parts by weight__ 85
    Crotonic acid _____do____ 5
    2 ethyl hexyl crotonate _____do____ 10
  An aqueous solution:
    CMC _____do____ 2
    Sodium lauryl sulfonate _____do____ 2
    Potassium persulfate _____do____ 1
    Demineralized water _____do____ 100
Polymerization condition—
  Temperature _____° C__ 65–70
  Polymerization time during which dropping
    was carried out _____hours__ 4
  Ripening time _____do____ 2
  Blowing of nitrogen, one hour, at 80° C.

After blowing of nitrogen, the resulting solution was treated with one part by weight of 5 percent aqueous ammonia to obtain 204 parts by weight of emulsion polymerized solution. Unreacted monomer was recovered in an amount of 0.5 part by weight. The solid content, the resin concentration of the emulsion polymerized solution and efficiency based upon the monomers used were, 51.1%, 50.2% and more than 99%, respectively.

The same comparison was carried out as in Example 1 in the points of viscosities of ammonia alkaline aqueous solution having a 20% resin concentration and of the coating color containing 60% solid between the product of Example 2 and that of vinyl acetate-crotonic acid copolymer. The results are shown in the following table.

|  | Product of Example 2, cps. | Product of control, cps. |
|---|---|---|
| Viscosities of ammonia alkaline aqueous solution having a concentration of 20% resin at 30° C. and 30 r.p.m. | 150 | 25,000 |
| Viscosities of 60% coating color at 30° C. and 30 r.p.m. | 4,500 | 60,000 |

Example 3

The emulsion polymerization was carried out in the same polymerization vessel as in Example 1 by using the following formulation and polymerization condition.

Formulation—
  A mixture of monomers:
    Vinyl acetate _____parts by weight__ 80
    Crotonic acid _____do____ 5
    Lauryl crotonate _____do____ 15
  An aqueous solution:
    CMC _____do____ 2
    Emulgen 120 _____do____ 2
    Ammonium persulfate _____do____ 1
    Demineralized water _____do____ 100
Polymerization condition—
  Temperature _____° C__ 65–70
  Polymerization time during which dropping
    was carried out _____hours__ 4
  Ripening time _____do____ 2
  Blowing of nitrogen, one hour, at 80° C.

After blowing of nitrogen, the resulting solution was treated with one part by weight of 5 percent aqueous ammonia to obtain 204 parts by weight of emulsion polymerized solution. Unreacted monomer was recovered in an amount of 0.4 part by weight. The solid content, the resin concentration of the emulsion polymerization solution and efficiency based upon the monomers used were, 50.9%, 49.8% and more than 99%, respectively.

The same comparison as in Example 1 was carried out in the points of viscosities of 20% ammonia alkaline aqueous solution and of the coating color containing 60% solid between the product of Example 3 and that of control copolymer of vinyl acetate and crotonic acid. The results are shown in the following table.

|  | Product of Example 3, cps. | Product of control, cps. |
|---|---|---|
| Viscosities of ammonia alkaline aqueous solution having a concentration of 20% resin at 30° C. and 30 r.p.m. | 200 | 22,000 |
| Viscosities of 60% coating color at 30° C. and 30 r.p.m. | 5,000 | ca. 65,000 |

Example 4

The emulsion polymerization was carried out in the same polymerization vessel as in Example 1 by using the following formulation and polymerization condition.

Formulation—
  A mixture of monomers:
    Vinyl acetate _____parts by weight__ 75
    Crotonic acid _____do____ 5
    Stearyl crotonate _____do____ 20
  An aqueous solution:
    Gum arabic _____do____ 2
    Nonion NS220 _____do____ 2
    Ammonium persulfate _____do____ 1
    Demineralized water _____do____ 100
Polymerization condition—
  Temperature _____° C__ 65–70
  Polymerization time during which dropping
    was carried out _____hours__ 4
  Ripening time _____do____ 2
  Blowing of nitrogen, one hour, at 80° C.

After blowing of nitrogen, the resulting solution was treated with one part by weight of 5 percent aqueous ammonia to obtain 204 parts by weight emulsion polymerized solution. Unreacted monomer was recovered in an amount of 0.3 part by weight. The solid content, resin concentration of the emulsion polymerized solution and efficiency based upon the monomers, were 50.8, 50.1 and more than 99%, respectively.

The same comparison as in Example 1 was carried out in the points of viscosities of ammonia alkaline aqueous solution containing 20% resin and of the coating color containing 60% solid between the product of Example 4 and that of the control copolymer of vinyl acetate and crotonic acid. The results are shown in the following table.

|  | Product of Example 4, cps. | Product of control, cps. |
|---|---|---|
| Viscosities of ammonia alkaline aqueous solution having a concentration of 20% resin at 30° C. and 30 r.p.m. | 350 | ca. 20,000 |
| Viscosities of 60% coating color at 30° C. and 30 r.p.m. | 5,500 | ca. 55,000 |

Example 5

The suspension polymerization was carried out in the same polymerization vessel as in Example 1 by using the following formulation and polymerization condition.

Formulations—
  A mixture of monomers:
    Vinyl acetate _____parts by weight__ 80
    Crotonic acid _____do____ 5
    Cetyl crotonate _____do____ 15
    Benzoyl peroxide _____do____ 1
  An aqueous solution:
    Demineralized water _____do____ 100
    Polyvinyl alcohol _____do____ 0.5
Polymerization condition—
  Temperature _____° C__ 65–67
  Polymerization time _____hours__ 9
  Blowing of nitrogen, one hour at 70° C.

After blowing of nitrogen and cooling, the resulting pearl-like powder was filtered by a filter cloth, washed with water and dried to give the product, 5.5 parts of unreacted monomer (vinyl acetate) were recovered and 84.5 parts of pearl-like product were obtained which corresponds to 89.8% efficiency.

By the same procedure the pearl-like polymer was prepared, from 95 parts by weight of vinyl acetate and 5 parts by weight of crotonic acid and used as a control polymer. The viscosities of ammonia alkaline aqueous solution containing 20% resin and of the coating color containing 60% solid between the product of the Example 4 and that of the control copolymer were compared. The results are shown in the following table.

|  | Product of Example 5, cps. | Product of control, cps. |
|---|---|---|
| Viscosities of ammonia alkaline aqueous solution having a concentration of 20% resin at 30° C. and 30 r.p.m. | 400 | 25,000 |
| Viscosities of 60% coating color at 30° C. and 30 r.p.m. | 5,500 | ca. 60,000 |

Example 6

The suspension polymerization was carried out in the same polymerization vessel as in Example 1 by using the following formulation and polymerization condition.

Formulation—
  A mixture of monomers:
    Vinyl acetate _____parts by weight__ 75
    Crotonic acid _____do____ 5
    Stearyl crotonate _____do____ 20
    Azobisisobutyronitrile _____do____ 1
  An aqueous solution:
    Demineralized water _____do____ 300
    Polyvinyl alcohol _____do____ 0.6
Polymerization condition—
  Temperature _____° C__ 65–67
  Polymerization time _____hours__ 9
  Blowing of nitrogen, one hour at 70° C.

After recovering unreacted monomer by nitrogen blowing and then cooling, the pearl-like polymer was separated by the use of a filter cloth and washed with water and dried over night. 6.0 parts by weight of unreacted monomer were recovered and 82.5 parts by weight of pearl-like polymer were obtained which corresponds to 87.9% efficiency.

By using the pearl polymer prepared from 95 parts by weight of vinyl acetate and 5 parts by weight of crotonic acid, as a control copolymer, the comparison of the viscosities of ammonia alkaline aqueous solution containing 20% resin and of the coating color containing 60% solid was carried out and the following results were obtained.

|  | Product of Example 6, cps. | Product of control, cps. |
|---|---|---|
| Viscosities of ammonia alkaline aqueous solution having a concentration of 20% resin at 30° C. and 30 r.p.m. | 300 | 23,000 |
| Viscosities of 60% coating color at 30° C. and 30 r.p.m. | 5,000 | 60,000 |

What is claimed is:
1. A method for producing an alkali-soluble resin which comprises
  (1) introducing into a copolymerization zone:
    (a) 75–94% by weight of vinyl acetate,
    (b) 3–15% by weight of crotonic acid, and
    (c) 3–20% by weight of an alkyl crotonate having at least 4 carbon atoms in the alkyl radical,
  (2) stirring said three components together and carrying out copolymerization in an aqueous solution in the presence of a radical polymerization catalyst and an emulsifier at a temperature between about 65° C. to 70° C., and
  (3) recovering the resultant random copolymer.

2. A method of claim 1 wherein the said alkyl crotonate is butyl crotonate.

3. A method of claim 1 wherein the said alkyl crotonate is octyl crotonate.

4. A method of claim 1 wherein the said alkyl crotonate is lauryl crotonate.

5. A method of claim 1 wherein the said alkyl crotonate is cetyl crotonate.

6. A method of claim 1 wherein the said alkyl crotonate is stearyl crotonate.

7. An alkali-soluble resin comprising a random copolymer of:
  (a) 75–94% by weight of vinyl acetate,
  (b) 3–15% by weight of crotonic acid, and
  (c) 3–20% by weight of an alkyl crotonate having at least 4 carbons in the alkyl radical,
said resin having a viscosity lower than 1000 cps. when one part of 28% aqueous solution of ammonia is added to 10 parts by weight of said resin, together with enough additional water to adjust the resin concentration to 20% by weight, and the viscosity of the resulting solution measured at a temperature of 30° C. with a stirring of 30 r.p.m.

8. An alkali-soluble resin according to claim 7 wherein said alkyl crotonate is butyl crotonate.

9. An alkali-soluble resin according to claim 7 wherein said alkyl crotonate is octyl crotonate.

10. An alkali-soluble resin according to claim 7 wherein said alkyl crotonate is lauryl crotonate.

11. An alkali-soluble resin according to claim 7 wherein said alkyl crotonate is cetyl crotonate.

12. An alkali-soluble resin according to claim 7 wherein said alkyl crotonate is stearyl crotonate.

References Cited

UNITED STATES PATENTS 2,966,480  12/1960  Wechsler et al. _____ 260—85.7

OTHER REFERENCES

Ser. No. 417,808 (A.P.C.), published Apr. 30, 1943, and now abandoned.

JOSEPH L. SCHOFER, Primary Examiner

STANFORD M. LEVIN, Assistant Examiner

U.S. Cl. X.R.

117—155; 260—29.6, 41, 78.5, 85.7